Nov. 17, 1925.

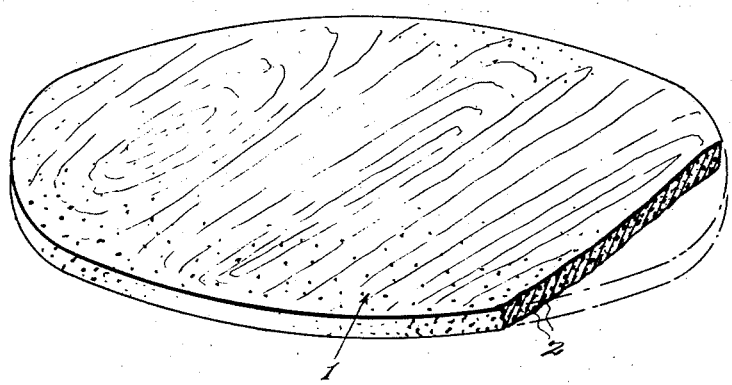
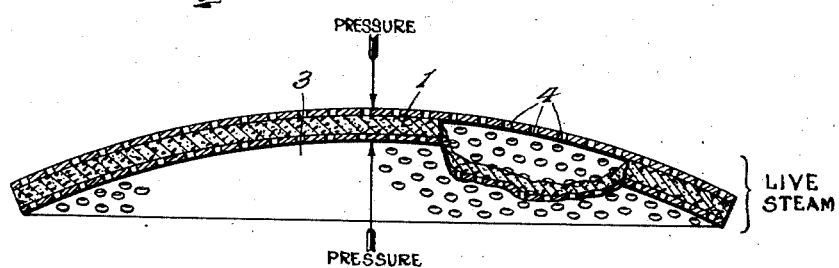
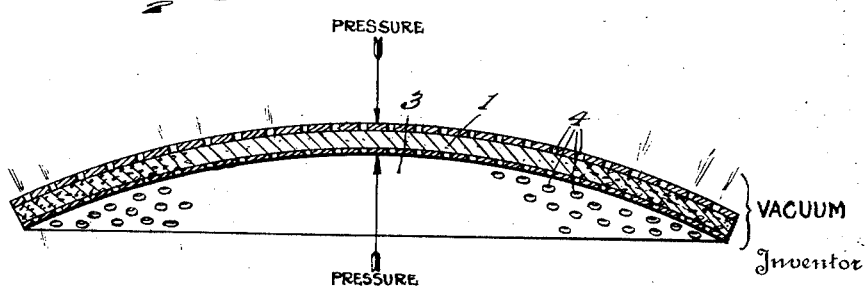

H. N. ATWOOD 1,561,763

COMPOSITE LAMINATED STRUCTURE AND METHOD OF MAKING SAME

Original Filed Aug. 23, 1923   2 Sheets-Sheet 2

Inventor

Harry N. Atwood.

By Lacy & Lacy, Attorneys

Patented Nov. 17, 1925.

1,561,763

UNITED STATES PATENT OFFICE.

HARRY N. ATWOOD, OF MONSON, MASSACHUSETTS, ASSIGNOR TO RUBWOOD, INC., OF LAWRENCE, MASSACHUSETTS, A CORPORATION OF MASSACHUSETTS.

COMPOSITE LAMINATED STRUCTURE AND METHOD OF MAKING SAME.

Application filed August 23, 1923, Serial No. 658,943. Renewed February 11, 1925.

*To all whom it may concern:*

Be it known that I, HARRY N. ATWOOD, a citizen of the United States, residing at Monson, in the county of Hampden and State of Massachusetts, have invented certain new and useful Improvements in Composite Laminated Structures and Methods of Making Same, of which the following is a specification.

This invention relates to a composite laminated structure or material and the method of producing the same. In the construction of wheel bodies, rims, and other parts, and in the construction of various other articles, structures, and devices, it is desirable to employ a material which will possess a desirable degree of resiliency, strength and flexibility and which will not be subject to deterioration or to rupture on account of impacts, will be water-proof and will be capable of being worked with the same facility as wood or metal. It has been proposed to employ wood veneer in producing a material possessing these qualities, and various veneer products have been made and used with a greater or less measure of success. In some cases the sheets of veneer are united by adhesive, and the composite structure thus produced is worked into the required forms. In other instances sheets of rubber have been interposed between veneer plies and, by a process of vulcanization, a structure has been produced which presents many advantages over a veneer structure in which the veneer plies are merely adhesively united. In fact, a structure comprising plies of wood veneer and bonding plies of rubber constitutes an ideal material for employment in various arts as, for example, in the manufacture of vehicle wheels, the parts of vehicle bodies, aeroplane propellers, and in many other manufactures, too numerous to mention. It is essential, however, that the veneer and rubber bonding plies be intimately bonded together so that the material will possess the requisite strength and not be subject to deterioration. In consideration of the foregoing, it is the primary object of the present invention to produce a composite laminated structure possessing all of the desirable qualities above mentioned and in which there shall be a more intimate union of the veneer and rubber plies than has heretofore been considered possible.

Another equally important object of the invention is to evolve a process by which the material comprising the rubber bonding plies may be carried into the pores of the veneer plies and thus become so intimately incorporated therewith as to produce a structure more nearly homogeneous than a laminated veneer ply structure produced by any other previously known process.

In the accompanying drawings:

Figure 1 is a sectional perspective view illustrating a veneer ply in the condition it will present in the initial step of the process;

Figure 2 is a sectional view illustrating one of the first steps of the process;

Figure 3 is a similar view illustrating a succeeding step;

Figure 4:
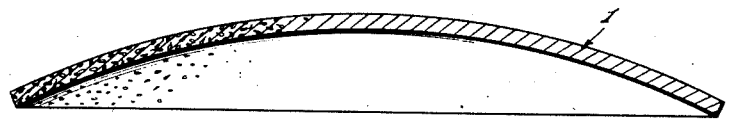
Figure 4 is a similar view illustrating the veneer ply after being subjected to the steps illustrated in Figs. 2 and 3 of the drawings.

In preparing the product, veneer blanks are first produced in the following manner. Green wood logs are placed in vats and subjected to the softening influences of live steam for such period of time as to permit the steam to thoroughly permeate all portions of the logs. The steamed logs, while still wet, are then sliced into sheets and these sheets are, if found expedient, cut to the required marginal contour of the product to be produced. Figure 1 of the drawings, for example, illustrates such a sheet after it has been cut from the log, and the sheet of veneer in this condition, indicated by the numeral 1, will have its pores 2 occupied by the natural moisture and sap content of the wood. That is to say, in the steaming step none of the resinous or sap contents are necessarily removed but they are, to a greater or less extent, rendered more fluid than in nature. However, the pores of the wood and the sap cells, are not voided, so that the wood, in this condition, possesses substantially all of its natural properties except that it is moist from the effects of the steaming operation. The ply shown in Figure 1 is of circular form and it may be presumed to represent a constituent ply of a disc vehicle wheel body, although it will be understood that the veneer plies may possess other marginal contours where parts of other characters are to be produced.

Having obtained a desired number of the veneer plies in the condition above outlined and illustrated in Figure 1, they are arranged in a pile with intervening plates 3 of metal provided with perforations 4 or any other means permitting of circulation of steam and other fluids. Any desired number of the veneer plies may be arranged in the pile, and the plates 3 will be of a form corresponding to the form which is to be finally given the veneer plies. A disc wheel body ordinarily possesses a more or less dished form and therefore in the illustrated embodiment, the plates 3 will be of substantially concavo-convex shape. Having arranged the plates and the wood plies in superimposed relation in the manner stated and as suggested by Figure 2, the assemblage is placed within the pit chamber of a hydraulic press and subjected to a carefully calculated degree of pressure. Live steam, under boiler pressure, is admitted to the pit chamber and pressure is applied. In this step of the process, the natural and artificially introduced moisture constituents of the wood are converted into steam or vapor. The plies are subjected to the action of live steam, while pressure is maintained upon them, and until it is certain that all of the moisture content of the plies has been vaporized.

When the conditions last described have been established, the supply of live steam to the pit chamber of the press is cut off, the steam is exhausted from the chamber, and suction is applied so as to create a partial vacuum in said chamber, pressure being in the meantime maintained upon the assemblage of plies. When a partial vacuum is established, the vaporized moisture content of the veneer plies will be discharged from the plies in the manner suggested by the illustration of Figure 3 of the drawings. That is to say the cells and pores of the veneer plies will be voided, the moisture content of the plies being discharged from said cells and pores. The application of suction to the veneer plies is continued until the plies are bone dry and when they assume this state, their pores and cells will be completely voided. By providing the perforations in the plates 3 or otherwise constructing these plates to permit of escape of the vaporized moisture content of the plies, the voiding of the cells and pores of the plies is effected although the plies are still subjected to pressure during the step of evacuation. Due to the fact that pressure is maintained upon the plies in this step, shrinking of the plies is prevented, and they will therefore possess substantially their initial dimensions at the completion of the step. However, having been subjected to pressure between plates of special form, they will have been given a permanent shape in accordance with the contour of the plates.

Figure 5:
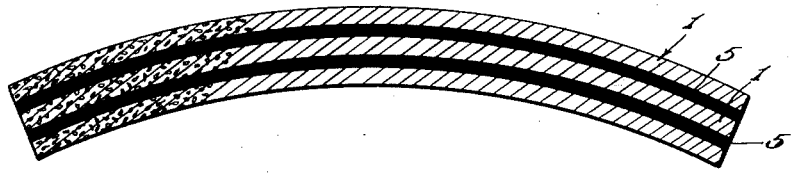
Figure 5 is a view similar to Figure 4 illustrating the manner in which the veneer and rubber bonding plies are to be arranged prior to the step of vulcanization.
Figure 6:
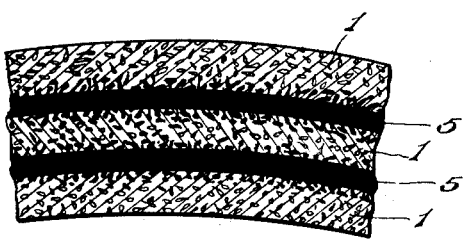
Figure 6 is a sectional view on a much enlarged scale illustrating the character of the finished product.

Having prepared a required number of the veneer plies in accordance with the preceding steps and which plies have their pores and cells expanded and evacuated, the said plies and sheets of soft uncured rubber or a suitable rubber composition, are alternated as shown in Figure 5 of the drawings, and the entire assemblage is then pressed in a suitable mold and while under pressure, is subjected to heat. In this step of vulcanization, the soft uncured rubber will be forced into the pores and cells of the veneer plies as illustrated in a more or less diagrammatically and exaggerated manner in Figure 6 of the drawings, the rubber plies or sheets being indicated by the numeral 5. It will now be evident that the finished product comprises plies of veneer and rubber bonding plies, the material of the bonding plies entering and filling the pores and cells of the veneer plies and thus effecting an intimate incorporation of the rubber plies with the veneer plies. The material will obviously possess a desirable degree of resiliency; the union of the veneer and rubber plies is so intimate that there is no likelihood of any separation of the plies taking place; the product is substantially water-proof; there is no likelihood of distintegration of the product either through deterioration or through impacts or stresses; and, the product will be tough and extremely durable and yet capable of being readily worked or machined and finished in any required manner.

Having thus described the invention, what is claimed as new is:

1. The process of producing a composite laminated structure which comprises preparing plies of veneer, evacuating the pores and cells of the plies, arranging the plies in alternation with sheets of uncured rubber, and subjecting the whole to heat and pressure to cause the rubber to enter the said pores and cells and become intimately incorporated with the said veneer plies and bond the same.

2. The process of producing a composite laminated structure which comprises preparing plies of veneer, removing the moisture content of the plies from the pores and cells thereof, arranging the plies in alternation with sheets of uncured rubber and subjecting the whole to heat and pressure to cause the rubber to occupy the pores and cells of the plies and become intimately incorporated with the said veneer plies and bond the same.

3. The process of producing a composite laminated structure which comprises preparing plies of veneer, subjecting the said plies to the action of live steam, whereby to convert the moisture content into a fluid state, subjecting the plies to a partial vacuum to effect evacuation of the pores and cells and a drying of the plies, arranging the plies in alternation with sheets of uncured rubber, and subjecting the whole to heat and pressure to cause the rubber to enter the said pores and cells and become intimately incorporated with the said veneer plies and bond the same.

4. The process of producing a composite laminated structure, which comprises preparing plies of veneer, subjecting the plies to pressure in the presence of live steam whereby to bring the moisture content of the plies into a fluid state, subjecting the plies to a partial vacuum under mechanical pressure to effect evacuation of the pores and cells, arranging the plies in alternation with sheets of uncured rubber, and subjecting the whole to heat and pressure to cause the rubber to enter the said pores and cells and become intimately incorporated with the said veneer plies and bond the same.

5. The process of producing a composite laminated structure which comprises preparing plies of veneer, disposing the plies between porous plates and subjecting them to pressure in the presence of live steam, subjecting the plies, while still under pressure, to a partial vacuum to effect evacuation of the pores and cells of the plies, arranging the plies in alternation with sheets of uncured rubber, and subjecting the whole to heat and pressure to cause the rubber to enter the said pores and cells and become intimately incorporated with the said plies and bond the same.

6. The process of producing a composite laminated structure which comprises preparing plies of veneer, subjecting the plies to the action of live steam whereby to bring the moisture content of the plies into the condition of a fluid, subjecting the plies to a partial vacuum under mechanical pressure and until dry, whereby to evacuate the pores and cells of the plies, arranging the plies in alternation with sheets of uncured rubber, and subjecting the whole to a process of vulcanization whereby to cure the rubber and bond the veneer plies together and cause a portion of the rubber to enter the said pores and cells.

7. A composite laminated structure comprising plies of veneer having their cells and pores evacuated, and a bonding ply of rubber uniting the veneer plies and occupying the evacuated pores and cells.

In testimony whereof I affix my signature.

HARRY N. ATWOOD. [L. S.]